UNITED STATES PATENT OFFICE.

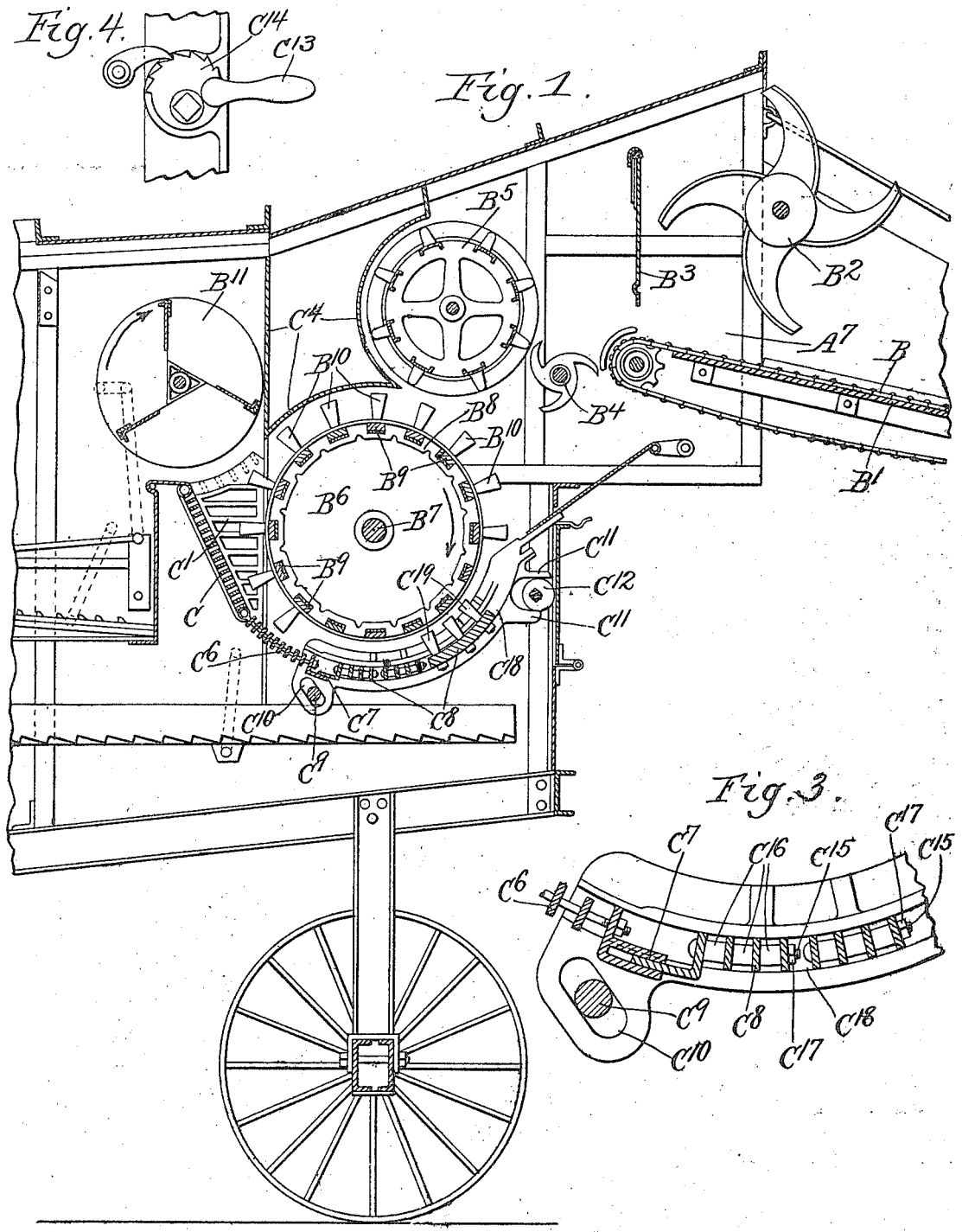

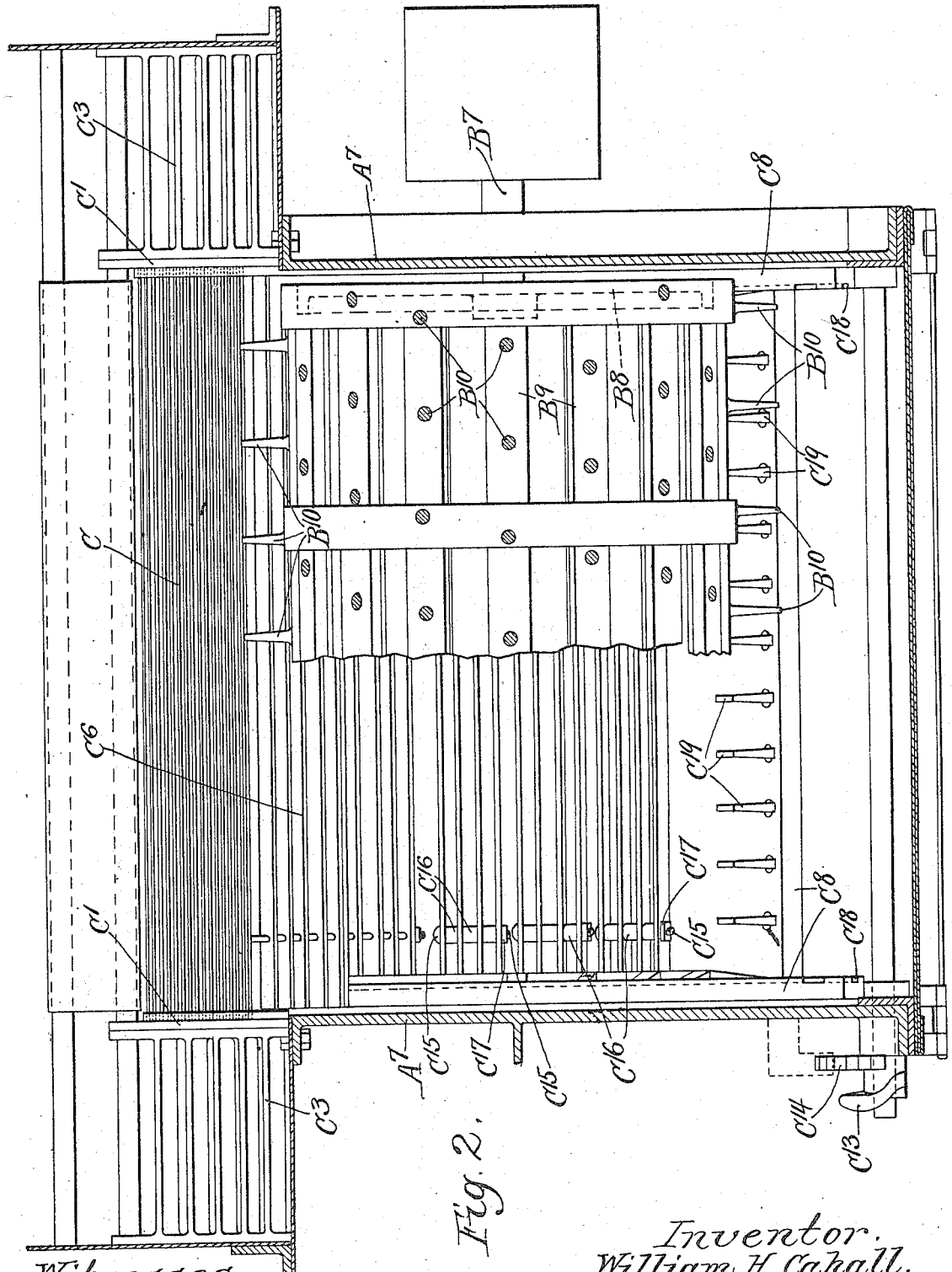

WILLIAM H. CAHALL, OF RACINE, WISCONSIN, ASSIGNOR, BY MESNE ASSIGNMENTS, TO ADVANCE-RUMELY COMPANY, OF LAPORTE, INDIANA, A CORPORATION OF INDIANA.

CYLINDER-MACHINE.

1,238,102.

Specification of Letters Patent.

Patented Aug. 28, 1917.

Original application filed October 16, 1914, Serial No. 866,900. Divided and this application filed February 3, 1916. Serial No. 75,924.

*To all whom it may concern:*

Be it known that I, WILLIAM H. CAHALL, a citizen of the United States, residing at Racine, in the county of Racine and State of Wisconsin, have invented a certain new and useful Improvement in Cylinder-Machines, of which the following is a specification.

My invention relates to cylinder machines and has for one object to provide a new and improved concave and cylinder combination for use in connection with separators and the like. Another object is to provide means for more effectively and economically treating the grain as it enters the separator. Other objects will develop from time to time in my specification.

The subject matter of this specification is based upon and has been divided out of my copending application No. 866,900, filed October 16, 1914, and I wish this present application to be regarded as a divisional application based upon my previous copending application.

My invention is illustrated more or less diagrammatically in the accompanying drawings, wherein—

Figure 1 is a detail longitudinal section through the head end of a separator showing parts in elevation and parts in section;

Fig. 2 is a plan view on an enlarged scale with parts omitted and broken away of the grate and cylinder;

Fig. 3 is a detail in cross section on an enlarged scale of a portion of the adjustable concave.

Fig. 4 is an end elevation of the controlling means for controlling and rotating the eccentric shaft.

Like parts are indicated by like letters in all the figures.

I have illustrated those parts of a separator which are necessary to show the position of the parts comprising my invention and their coöperation with the remainder of the machine.

Feeding and breaking mechanism.

B is the conveyer belt riding along the feeder table $B^1$, which table is supported on the box or housing $A^7$. $B^2$ is the rotary band cutter, $B^3$ a swinging guard apron immediately behind the band cutter, $B^4$ a retarder shaft immediately beyond the end of the conveyer, and $B^5$ a spreading cylinder beyond the end of the conveyer and above the threshing cylinder $B^6$. The threshing cylinder $B^6$ is located between the sides of the box or housing $A^7$ of the main separator housing and is of substantially the same length as the inside width of the box $A^7$. It is mounted on and rotates with the shaft $B^7$ and is made up of the two end disks $B^8$ which carry the cross slats $B^9$ from which project the teeth $B^{10}$. $B^{11}$ is a stripper or beater wheel located within the main separator housing and slightly above and beyond the cylinder and has for its function, rotating as it does in the same direction as the cylinder, to strip off the straw which might otherwise become twisted around it.

C is an inclined grate section suspended within the main separator housing and of substantially the same width as the length of the cylinder. It is slightly removed from the tangent line of the cylinder teeth at its bottom and upwardly and rearwardly inclined toward its upper edge immediately beneath the beater wheel $B^{11}$. $C^1$, $C^1$ are side grate extensions parallel with the two ends of the cylinder and extending from the ends of the grate C to the rear line of the housing or box $A^7$, thus closing the aperture between the rear side of the housing and the grate and confining the material which might otherwise be discharged more or less longitudinally from the cylinder. $C^3$, $C^3$ are curved grate sections located above the upper edge of the grate C and extending from the upper edges of the grates $C^1$ and the upper edge of the grate C outwardly to the outer wall of the separator housing. These sections are concentric with the beater $B^{11}$ and assist in closing the remainder of the space between the housing $A^7$ and the main separator housing. $C^4$ is a filler block located in the housing $A^7$ and closing off the space between that housing and the main housing above the cylinder. This filler block, it will be noted, has on its inner side a vertical wall, on its bottom a curved wall concentric with the separating cylinder, and on its outer side a curved wall concentric with the wheel $B^5$. $C^6$ is a concave grate section pivoted along the bottom line of the grate C and having a slidable connection at $C^7$ with a concave grate section $C^8$. The concave grate section $C^8$ is supported at its inner and lower end by the bolt $C^9$ in a curved slot C¹⁰ and at its upper forward end by the jaws C¹¹ in engagement with an eccentric C¹², which eccentric is controlled by a handle C¹³ and ratchet C¹⁴. These concaves, it will be noted, are just the length of the inside width of the housing A⁷ and completely fill it as it extends down as far as the lowest point of these concaves. The grates themselves are made up of grate sections as indicated composed of parallel bars tied together by the bolts C¹⁵, provided with spacing washers C¹⁶ and nuts C¹⁷ and slidable in the slots C¹⁸. The concaves are also provided with teeth C¹⁹ which pass between the teeth B¹⁰ on the cylinder.

It is understood that the slidable connection between the concave and the grate is provided so that the distance between the concave and the cylinder may be varied at the will of the operator and so that a continuous connection is still obtained between the concave and the grate to prevent escape of material. It is evident also that this slidable connection permits expansion or contraction or bending or displacement of parts while the machine is in operation, without permitting the escape of the chaff and straw down into the grain containing part of the mechanism.

The use and operation of my invention are as follows:

The bundles of grain are pitched into the conveyer in the usual manner and carried by it up past the band cutting knives. The apron is pushed aside to allow the bundles to enter and they pass down between the cylinder and concaves. The rapidly moving feeder performs two functions. It spreads out the grain in the bundle, thus breaking up the continuity of the individual bundle, and also separates a great deal of the grain from the heads. This grain is knocked, rubbed and brushed out, passing through the concaves where it is discharged upon the grain pan. The straw, carrying with it still a considerable amount of grain, is passed up over the upper edge of the grate into the straw rack, being peeled off or swept off from the cylinder by the beater wheel above the edge of the grate.

I claim:

1. The combination with a separator, a cylinder and concave of a separating grate projecting upwardly and rearwardly from said concave, said grate having at either end extension grate walls parallel with the ends of the cylinder.

2. The combination with a separator, a cylinder and concave of a separating grate projecting upwardly and rearwardly from said concaves, said grate having at either end extension grate walls parallel with the ends of the cylinder, extensions projecting from the top of said walls to the adjacent sides of the separator.

3. A separator having a two-part concave, the parts arranged edge to edge, and means for adjusting said two parts to and from the cylinder, said two parts being separated by a sliding joint parallel with the axis of rotation of the cylinder.

4. In a separator having a cylinder, a two-part concave, the parts arranged edge to edge, one of the concave parts being pivoted on a fixed axis along its upper edge, means for bodily adjusting the other part to and from the cylinder and a sliding connection between said parts.

In testimony whereof, I affix my signature in the presence of two witnesses this twenty second day of January 1916.

WILLIAM H. CAHALL.

Witnesses:
LINCOLN G. BACKUS,
THOS. NEVILLE.